United States Patent [19]
Greenberg et al.
[11] 3,710,193
[45] Jan. 9, 1973

[54] HYBRID REGULATED POWER SUPPLY HAVING INDIVIDUAL HEAT SINKS FOR HEAT GENERATIVE AND HEAT SENSITIVE COMPONENTS

[75] Inventors: Sol Greenberg, Roslyn; Robert D. Gold, Saint James; Richard J. Projain, Syosset, all of N.Y.

[73] Assignee: Lambda Electronics Corporation, Huntington, N.Y.

[22] Filed: March 4, 1971

[21] Appl. No.: 121,063

[52] U.S. Cl. ............317/100, 317/234 A, 317/235 Q
[51] Int. Cl. ............H02b 1/00
[58] Field of Search........ 317/100, 234 A; 174/15 R, 16R; 317/235 Q

[56] References Cited

UNITED STATES PATENTS

| | | | |
|---|---|---|---|
| 3,308,271 | 3/1967 | Hilbiber | 317/235 Q X |
| 3,351,698 | 11/1967 | Marinace | 174/15 R |
| 3,391,728 | 7/1968 | Kelly | 317/234 A X |
| 3,393,328 | 7/1968 | Meadows et al. | 317/235 Q X |
| 3,444,399 | 5/1969 | Jones | 317/235. Q X |
| 3,476,981 | 11/1969 | Burton et al. | 317/100 |
| 3,609,593 | 9/1971 | Boll et al. | 317/235 Q X |
| 3,536,133 | 10/1970 | Mattsson | 317/100 X |
| 3,261,904 | 7/1966 | Wulc | 174/15 R |
| 3,346,773 | 10/1967 | Lomerson | 317/100 |
| 3,351,698 | 11/1967 | Marinace | 174/15 R |
| 3,364,395 | 1/1968 | Donofrio et al. | 317/100 |
| 3,364,987 | 1/1968 | Per-Ake Byland et al. | 174/16 R X |
| 3,502,956 | 3/1970 | Fries et al. | 317/234 B |

*Primary Examiner*—Richard B. Wilkinson
*Assistant Examiner*—Stanley J. Witkowski
*Attorney*—Morgan, Finnegan, Durham & Pine

[57] ABSTRACT

An electronic power supply unit wherein a power transistor generative of undesired heat is carried by a first heat conductive plate spaced from a second heat conductive plate by a tubular shell of low thermal conductivity to form an enclosure. An integrated control circuit is carried by the second plate and connections are made to the power transistor and control circuit via connectors external to the enclosure.

24 Claims, 7 Drawing Figures

INVENTORS
SOL GREENBERG
ROBERT GOLD
BY RICHARD PROJAIN

Morgan, Finnegan, Durham & Pine
ATTORNEYS

INVENTORS
SOL GREENBERG
ROBERT GOLD
BY RICHARD PROJAIN
Morgan, Finnegan, Durham & Pine
ATTORNEYS

INVENTORS
SOL GREENBERG
ROBERT GOLD
BY RICHARD PROJAIN

Morgan, Finnegan, Durham & Pine
ATTORNEYS

INVENTORS
SOL GREENBERG
ROBERT GOLD
BY RICHARD PROJAIN

Morgan, Finnegan, Durham & Pine
ATTORNEYS

HYBRID REGULATED POWER SUPPLY HAVING INDIVIDUAL HEAT SINKS FOR HEAT GENERATIVE AND HEAT SENSITIVE COMPONENTS

BACKGROUND OF THE INVENTION

1. Field of the Invention

This invention relates to electric circuit units having one or more sources of internal heat to be dissipated or otherwise isolated from heat sensitive circuit components. Specifically, it relates to a unique electronic circuit package capable of use with other electronic equipment and so arranged that internal heat sources have minimal impairing effect on the circuit operation.

The invention finds particularly beneficial use in regulated DC power supplies, especially compact regulators for supplies that must be capable of producing substantial power outputs while being universally adaptable to *in situ* use by the customer, i.e., use by the customer as an integral part of the equipment constituting the load served by the regulated supply.

2. Description of the Prior Art

Various forms of regulators for DC regulated power supplies have been developed in compact or miniaturized form for *in situ* use by the power supply user. Thus, DC power supply regulators are available in the form of integrated circuit (IC) chips that may be incorporated directly and permanently into the circuit to be served by the supply. These chips, however, have limited current carrying capacity and are not capable of dissipating appreciable amounts of power. Accordingly, they find practical use only where a relatively low level of regulated output is required.

A number of hybrid power supply regulator arrangements have been used. Generally, such hybrid combinations may include individual small signal transistor chips, or integrated circuit chips, and power output devices, often a few external large-scale elements, such as capacitors and resistors, are found in some devices. For optimum operation of such a supply, and in view of temperature limitations inhering in all electronic devices, a heat sink or other heat dissipating arrangement should be incorporated to dispose of heat generated by high current carrying devices.

In one known type of hybrid regulator, a metal plate provides a mounting surface for all components. That is, both the regulating circuit (the voltage regulator) and the power output circuit (the power transistor(s)) are permanently mounted to a single plate which is affixed by the user to a suitable heat sink. When so mounted these two stages of the regulator are effectively short-circuited thermally, unless mounted to a highly effective heat sink of yet lower thermal conductance, and there is no means of thermally isolating the two stages. Thus, in such an arrangement, the thermal stability of the regulator depends directly upon the efficiency with which heat can be transferred away from the power output device.

In another known type of hybrid regulator, a metal base plate forms an interior mounting surface for the power transistor and other heat dissipative elements. Heat sensitive components, which may be carried on insulating plates or substrates supported in spaced relation above the base plate. This arrangement tends to provide a degree of thermal resistance between the power section and the control section(s), the entire arrangement is encased, usually in a metal can and there is accordingly a comparably high thermal resistance between the heat sensitive control section(s) and the environment. The effects of heat generated by the power section on the control elements depends on both thermal resistances. Because the latter resistance is appreciable, the power devices and heat sensitive elements are not sufficiently decoupled, thermally, to an extent required for good thermal stability.

Another characteristic of known small power supply regulators is the restricted mounting possibilities. Such known devices have only one heat transfer plate, and this must be affixed to the external heat sink, with connector pins extending through the base plate. The present invention may be mounted on one or more separate heat sinks and can achieve thermal stability even with significant temperatures at the power device.

SUMMARY OF THE INVENTION

It is thus one object of the invention to overcome the shortcomings of existing practices with respect to thermally limited circuits.

Another object, in general, is to present new circuit packaging techniques for electronic circuits having an internal source of undesired heat.

A further object is a new electronic power supply regulator that may be used with external equipment having a wide range of heat dissipation ratings.

Yet another object is a hybrid power supply regulator designed for operation at or near maximum temperature conditions notwithstanding the supply in end use may be combined with any of various unspecified heat sinks.

Additionally, it is an object of the invention to minimize the thermal effects of high power dissipating solid state elements upon other, thermally sensitive components of a circuit.

Briefly, the foregoing objects are fulfilled in an electronic circuit unit providing a thermal divider between the heat dissipative elements and the heat sensitive components. Preferably, this is accomplished by locating the high heat dissipative elements on one heat conductive member and the more temperature sensitive elements on a different heat conductive member physically joined to the first through a path of relatively high thermal resistance. Each heat conductive member may thus be connected to a separate heat sink to provide a thermal divider that minimizes heat transfer to the heat sensitive components and that establishes high thermal coupling to the environment.

In a preferred embodiment, as a power supply regulator, the members each constitute a thermally conductive plate separated by a thermally insulating shell, thereby forming an enclosure package for the electronic elements. Power output components are mounted to one plate while the control circuit components are mounted to the other.

In conjunction with the invention, a temperature responsive element may be thermally coupled to the power output components and electrically coupled to the control circuit to limit power dissipation by the power output components within their safe operating range and thereby to guard against inadvertent overloading by the user.

BRIEF DESCRIPTION OF THE DRAWINGS

Details of an exemplary preferred embodiment may be found in the following detailed description and associated drawings, of which.

DESCRIPTION OF THE PREFERRED EMBODIMENT

Circuit Description

Figure 1:
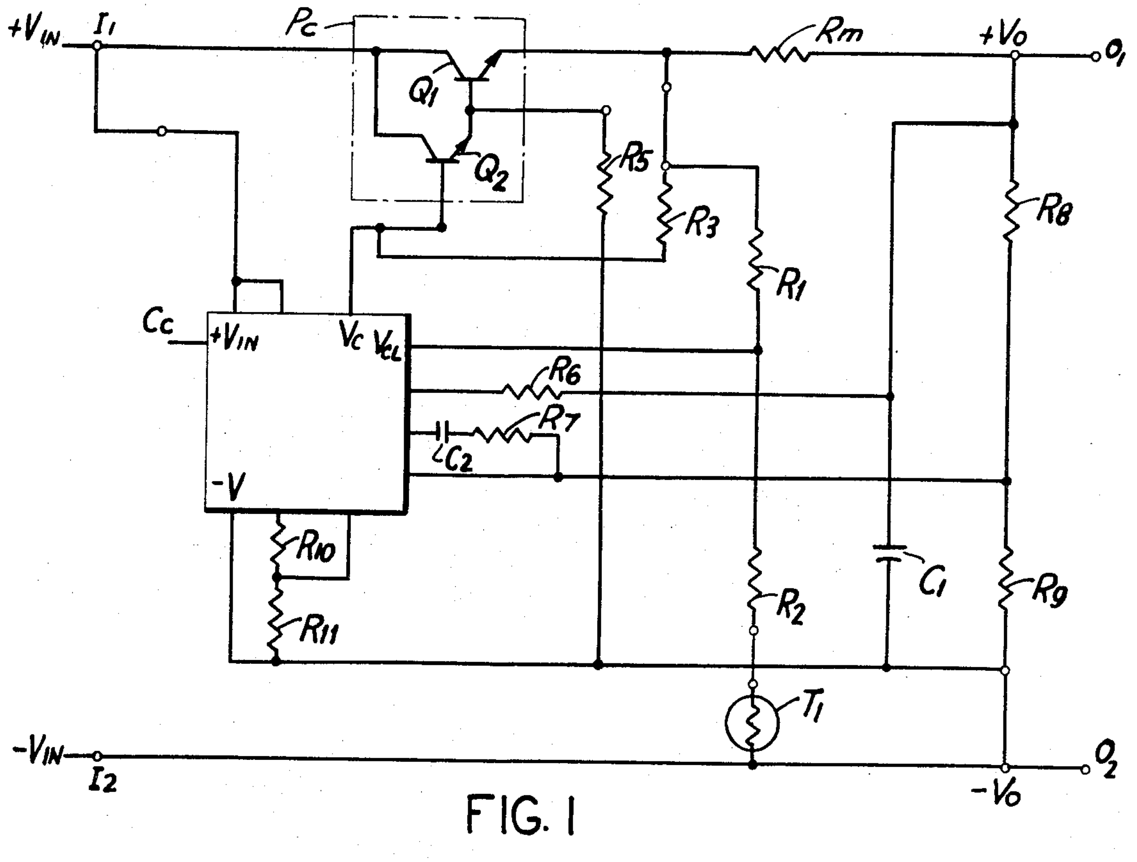
FIG. 1 is a schematic electrical diagram of an electrical regulated power supply incorporating certain features of the invention.

FIG. 1 is an abbreviated circuit schematic of the power supply regulator, which is supplied by an unregulated voltage from an external DC source (not shown) connected to input terminals $I_1$ and $I_2$ of the regulator. As a consequence of the circuit regulation action, generally described hereinafter, a regulated output appears at terminals $O_1$ and $O_2$. The circuit, which is representative, constitutes a supply having a nominal 5V, 5A output capability.

The regulator is of the series type and, accordingly, there is provided in the circuit between input terminal $I_1$ and output terminal $O_1$, a pass transistor circuit $P_c$ fabricated as an integrated circuit. Illustratively, only one pass transistor $Q_1$ and its associated driver $Q_2$ are shown. The transistor $Q_1$ of the power circuit $P_c$ has a high current capacity which, in conjunction with the driver $Q_2$, passes the entire rated current of the supply. Such integrated circuits are well known in the art but may be comprised of physically separate components, as well.

An external current monitoring resistor $R_m$ serves to monitor the load current and therefore is in series with the output current path. Its purpose is to develop a small voltage at maximum current which is fed to a portion of the control circuit $C_c$ to limit the output current to a maximum value. A capacitor $C_1$ across the output terminals $O_1$, $O_2$ filters the regulated output.

The control circuit which regulates the operation of the pass circuit $P_c$, includes an integrated circuit chip $C_c$ which, for example, might comprise a $\mu$A 723, a commercially available component. The control chip $C_c$ monitors the output voltage (at the junction of $R_8$ and $R_9$) and the output current (as sensed by $R_m$) and supplies the appropriate drive to driver $Q_2$ to achieve the requisite regulation. The elements $R_7$, $R_{10}$, $R_{11}$ and $C_2$ are also related to operation of the control chip $C_c$.

Although the particular operation of the circuit $C_c$ is not directly related to the invention, it should be remarked that it functions to apply appropriate bias to the base of the driver transistor $Q_2$ to effect regulation. The chip $C_c$ may, for example, include its own internal voltage regulator supplied by the input voltage $V_{in}$, and voltage control and output amplifiers which produce an output signal $V_c$ that feeds the base of the transistor $Q_2$. Thus, as the regulator output $+V_{out}$ increases, the control voltage $V_c$ becomes less positive to reduce the base current for the transistor $Q_1$. This results in an increased voltage drop across the series collector emitter path of the output transistor $Q_1$. To this end, the control chip $C_c$ is made responsive to the regulator output by connections to the resistor $R_6$ and the junction of the resistor $R_8$ and $R_9$.

The same sequence of events occurs for an undervoltage across the output terminals $O_1$, $O_2$, except that reverse changes take place. Specifically, a deficient output voltage $V_o$ reduces the voltage across $R_8$ and develops an error signal within the voltage control amplifier of the control chip $C_c$. This action yields a higher bias voltage at the base of the NPN transistor $Q_2$ to increase its conduction as well as the conduction of $Q_1$, thus providing sufficient current to maintain the output voltage at the rated value.

Thermal Protection

In series type regulators, the pass transistor chip $P_c$ is arranged in series with the output terminal and, as in the regulator of FIG. 1, is controlled by the regulator circuit chip $C_c$. Since, however, the pass transistor chip must accept full output current, its internal heat dissipation (due to internal impedance) constitutes the principal source of undesired heat within the unit, and this heat must be dissipated in order to avoid exceeding the maximum temperature ratings of both the pass transistor chip and control circuit chip. Thus, it is important to remove as much heat as possible from the power supply to obtain the best current and temperature ratings.

It is possible that the regulator will be subjected to unexpectedly high ambient temperatures, or to an electrical overload condition, and could also be connected to a poor heat sink. In these cases the regulator may undergo thermal overload unless protected. To this end, the unit is equipped with electronic means for reducing thermal overload by limiting the output current when the temperature of the pass chip exceeds an acceptable operating value. This thermal protector circuit includes a temperature sensitive element having a non-linear positive temperature coefficient. A suitable element of this type is the thermistor $T_1$, where resistance increases non-linearly with increasing temperature.

Physically, the thermistor $T_1$ is located adjacent the pass transistor chip in close thermal coupling to the junctions of $Q_1$, $Q_2$. (See FIG. 4.) Up to the maximum allowable temperature of these junctions, the resistance of the thermistor $T_1$ is fairly constant, rising at a low rate. However, as the critical temperature is approached, the resistance of the thermistor $T_1$ commences to increase at a relatively rapid rate, causing a pronounced change in the output control signal from the regulator control chip $C_c$. The driver $Q_2$ and the pass transistor $Q_1$ accordingly undergo a significant limiting action. If the temperature at the junction of the transistor $Q_1$ continues to increase, the thermistor $T_1$ will exert even greater control, to the extent of lowering the output current to that required to maintain the temperature of junction of the pass transistor at or below rated value.

Referring to FIG. 1, the thermistor $T_1$ is seen to constitute one element in a divider $R_1$, $R_2$, $T_1$, connected across the supply output terminal $O_2$ and the emitter of the pass transistor $Q_1$. Essentially, the divider is excited with the regulated output voltage.

As the thermistor enters its critical range at elevated temperatures, its greatly increased resistance raises the potential $V_{c1}$ of the control chip. At the limiting temperature, this potential increase results in a current clamping action by the control chip $C_c$. Thus, excess temperatures are detected by the current control amplifier of the control circuit chip $C_c$, which immediately reduces the output control voltage $V_c$ fed to the base of the driver $Q_2$.

A particular beneficial feature of the thermal protector circuit of the invention is its immediate sensitivity to injurious positive temperature gradients to influence the operation of the remote heat-sensitive control circuit.

Similarly, a small current resistor $R_m$ (e.g.,. 1–25 ohms) in series with the pass chip develops a voltage drop which, if too large, also produces a current limiting effect by the control chip.

Structural and Thermal Characteristics

Since the control circuit chip is the most temperature sensitive component of the overall system, operation of the pass transistor chip within its temperature limitations could generate sufficient heat to adversely affect operation of the control circuit. In accordance with the invention and contrary to the prior art practices, the control chip is thermally isolated from the heat generated by the pass chip. The manner in which this is accomplished is explained below.

Figure 2:
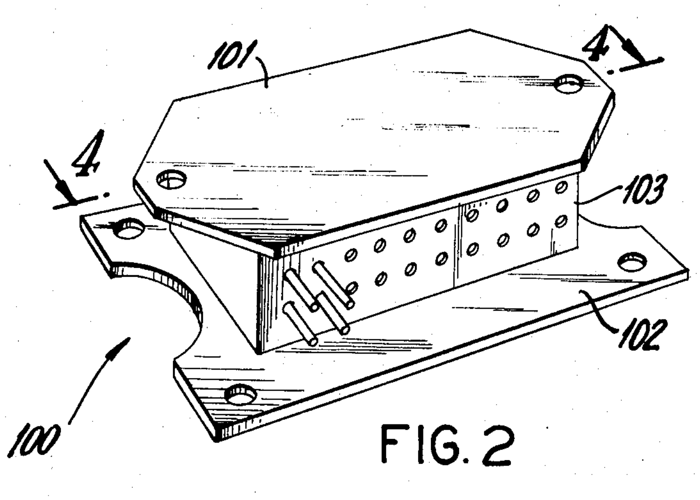
FIG. 2 is a perspective view of an assembled power supply unit according to the invention.
Figure 3:
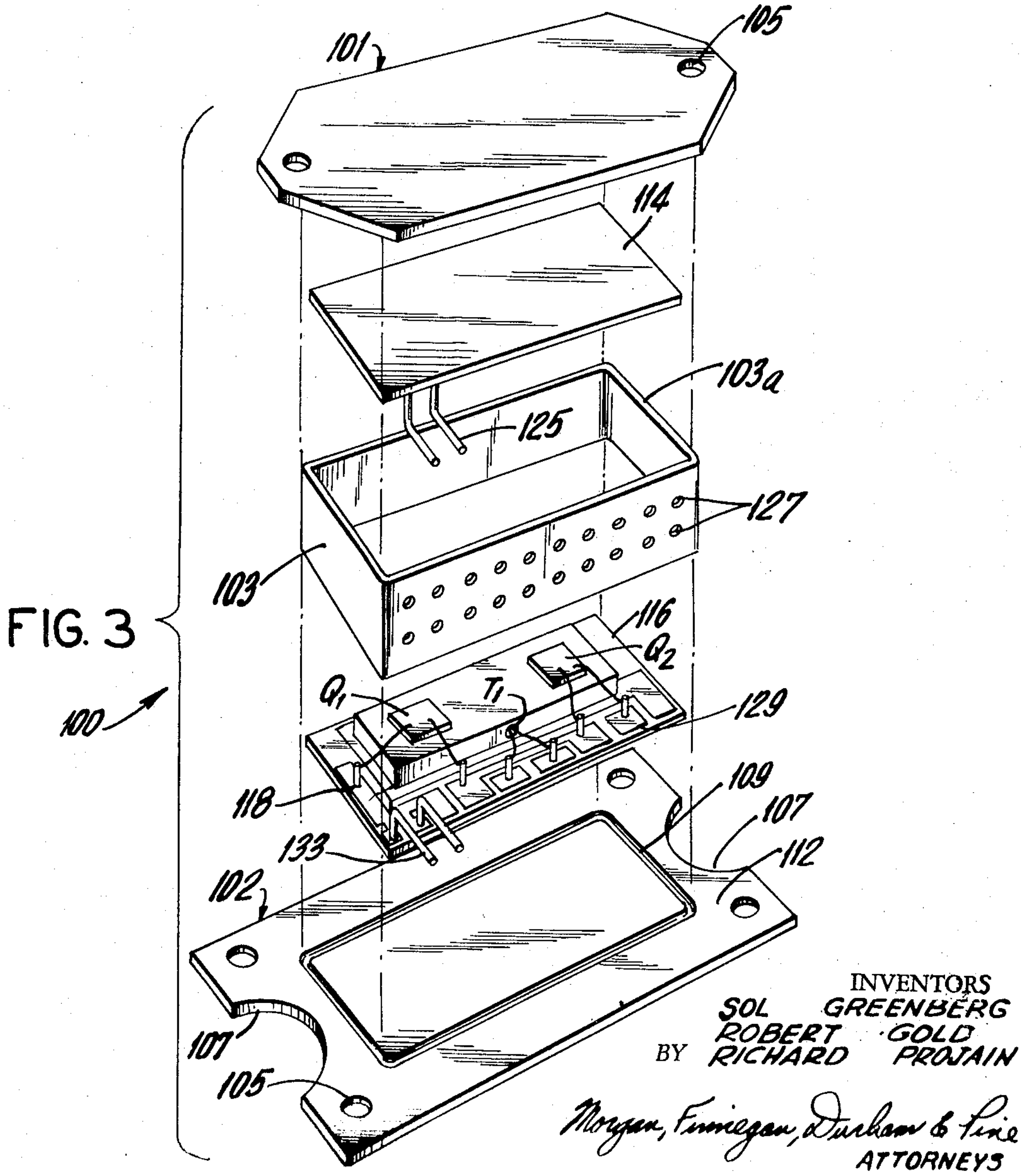
FIG. 3 is an exploded perspective view of the physical elements making up power supply of FIG. 2.

Referring to FIGS. 2 and 3, the physical relationship of the power supply elements may be seen. Basically, the unit 100 comprises a pair of spaced, parallel heat conductive metal plates 101, 102 separated and joined by a rectangular tubular shell 103 of high thermal resistance. A number of plastics of low thermal conductivity are suitable materials for construction of the shell, glass filled resins being one example. Throughholes 105 in the plates may be used to accept screws or other fasteners to mount the unit 100 to the equipment to be powered and notches 107 are formed in the ends of the base plate 102 to provide access to any fasteners used in the end holes of the smaller plate 101.

Physical dimensions for the exemplary 5V, 5A supply manifest its extreme compactness. Lateral dimensions of the plates (which may be made from 1/16–1/8 inch (flat copper, aluminum or steel stock) are about 1.5 × 2.0 inch. Overall depth (height) of the unit may be about 1.0 inch, with the corresponding dimensions of the shell 103 are being about 0.9 × 1.5 inch.

As illustrated in FIG. 3, each plate has a groove 109 formed on its interior-facing surface 112, 113 for accepting an edge 103*a* of the shell when the unit is assembled. The shell 103 may be secured to the plates 101, 102 by any suitable adhesive, such as epoxy, or by fasteners, solder or braze material.

Figure 6:
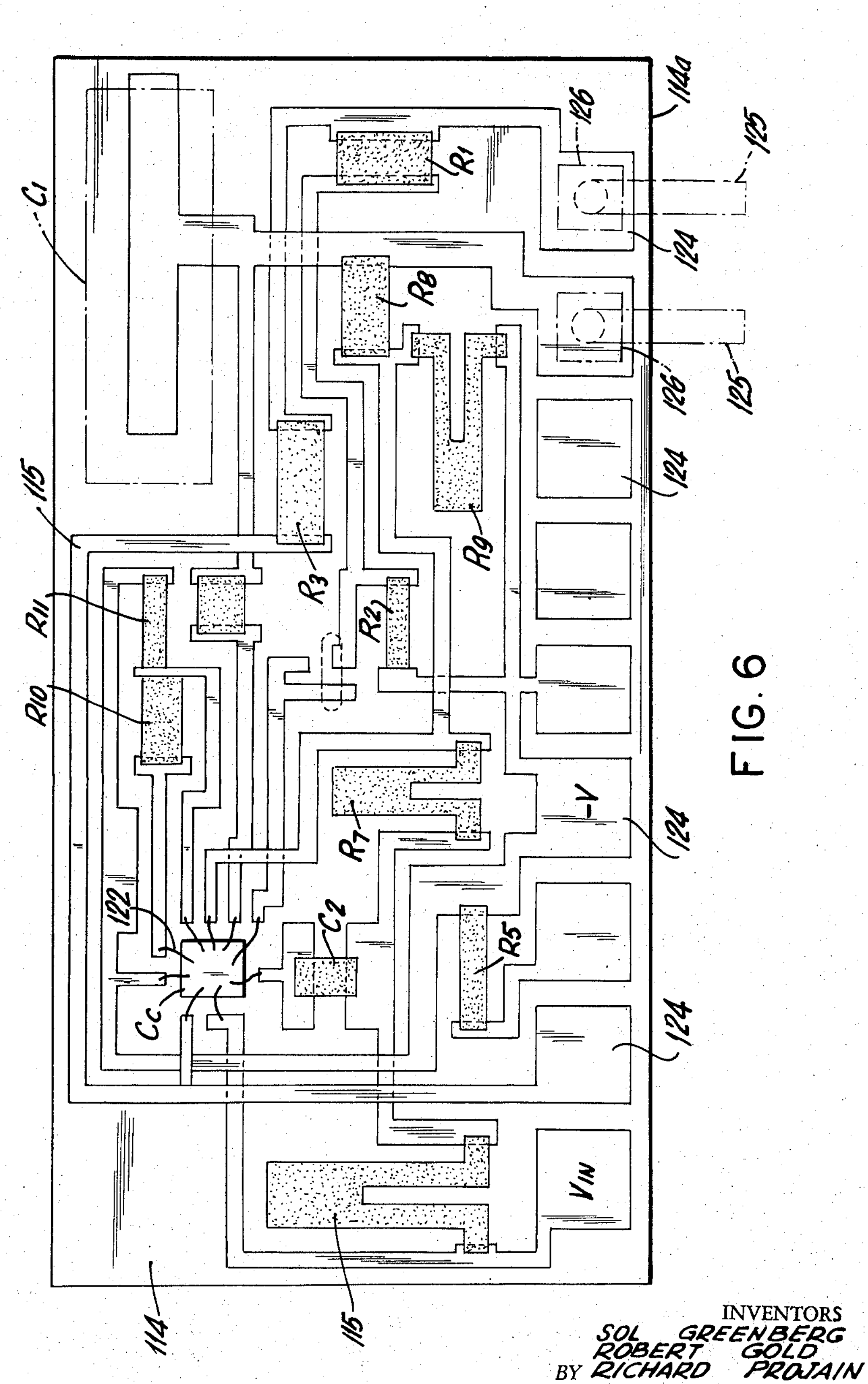
FIG. 6 is a plan view of the control circuit substrate of the supply, which carries the control chip and most of the external components.

Mounted directly to the surface 113 of the plate 101 is an insulating substrate 114 on which the signal chip $C_c$ and other elements of the circuit are mounted. Preferably the substrate has a low thermal resistance, but is electrically non-conductive. As embodied, all resistors and conductors are printed or deposited as a film 115 on the signal substrate 114, which illustratively is alumina (FIG. 6). The output capacitor $C_1$ is a discrete component soldered to the substrate. Further details of the control signal printed circuit formed on the substrate 114 are shown in FIG. 6.

Figure 7:
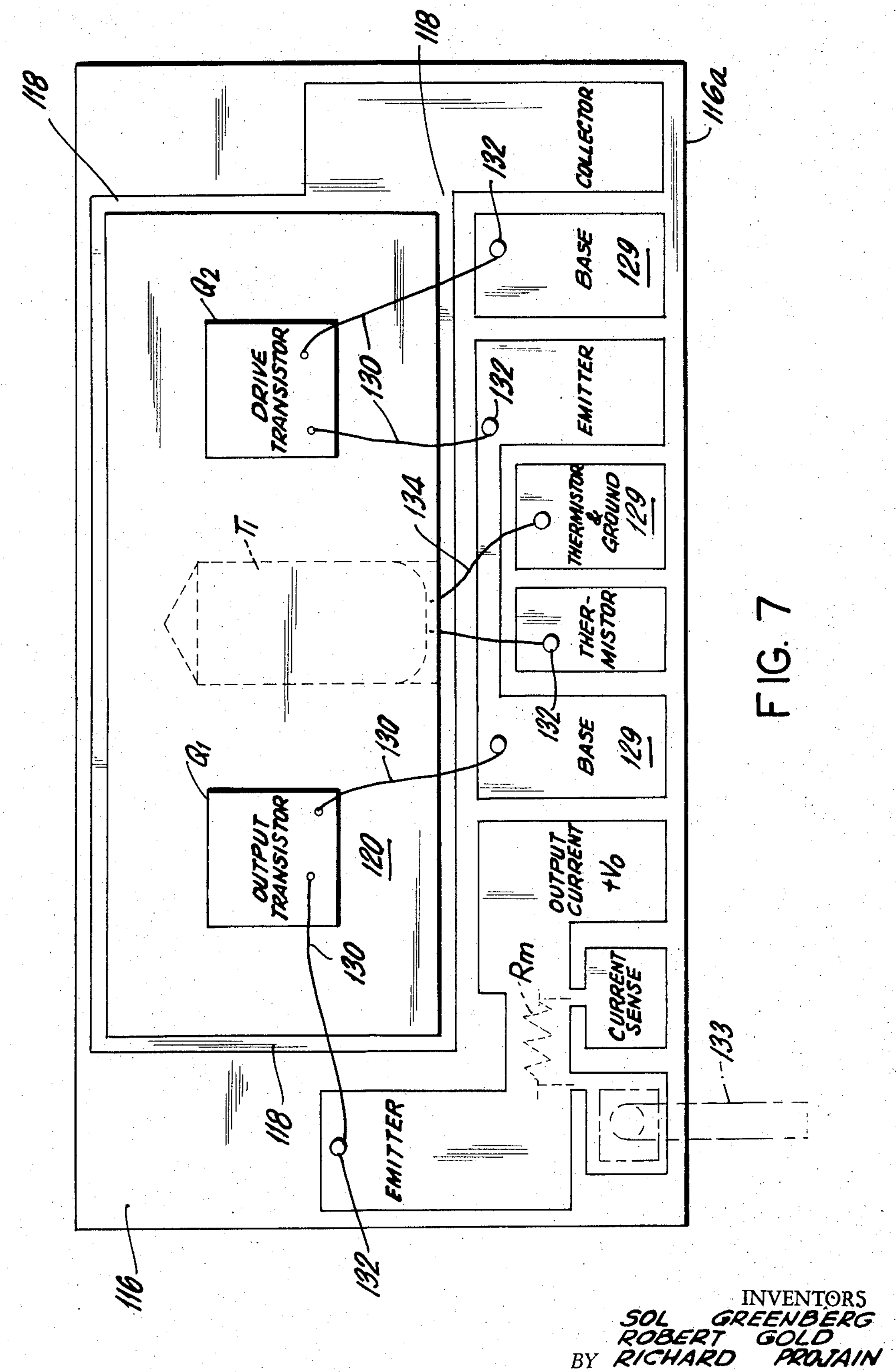
FIG. 7 is a plan view of the power circuit substrate of the supply, which carries pass and driver transistor chips for the circuit.

Mounted in a similar way to the interior surface 112 of the base plate 102 is a power substrate 116, also of alumina, the upper surface of which is metallized to form a printed circuit 118. The details of the printed circuit are illustrated in FIG. 7. Each of the substrates 114, 116 may be permanently secured in place by a thin layer of adhesive, such as epoxy, solder or braze material which offer low thermal resistance.

Figure 4:
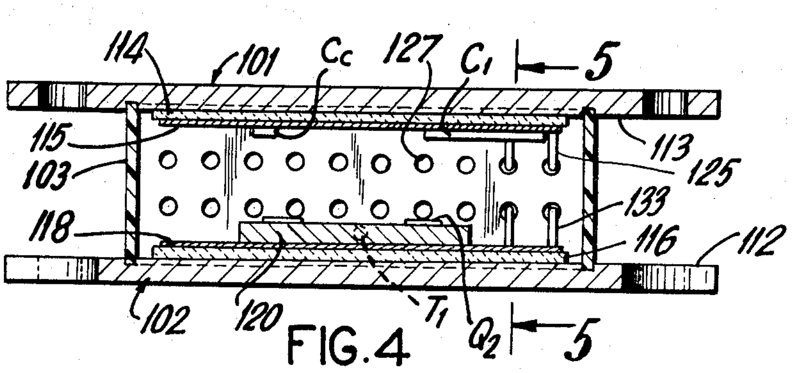
FIG. 4 is a schematic front elevational view, partially in cross-section, of the power supply of FIG. 2, showing internal structural aspects and configurations.
Figure 5:
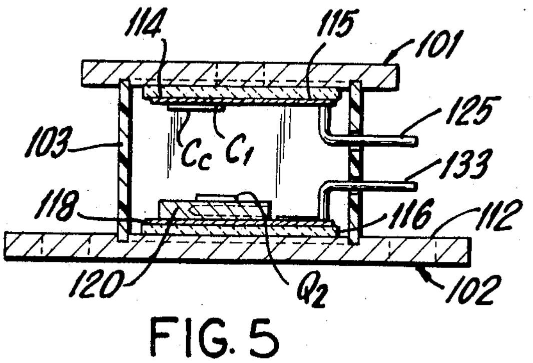
FIG. 5 is a side elevation view in cross-section of the power supply.

Referring to FIGS. 4 and 5, a metal heat spreader block 120 is seen to be mounted on a portion of the substrate 116. This metal block serves to spread any heat therein over a large area of the substrate, and thus provides a thermally conducting mounting for the transistor chips $Q_1$ and $Q_2$. The thermistor $T_1$ for the thermal protector circuit is also mounted on or in the heat spreader 120, being illustratively secured in a cavity intermediate the two transistor chips. It should be remarked that the transistors $Q_1$, $Q_2$ may be contained in a single integrated circuit chip, but, in either case, the thermistor is located to sense the temperature at or near the power transistor junction.

The power substrate 116 is essentially free of components other than those on the heat spreader 120, and the current sense resistor $R_m$, which is formed by the low resistance path through part of the printed circuit 118.

As illustrated in FIG. 6, all signal level components are mounted on the substrate 114, with conductors and resistors being printed as a film 115 directly on the substrate. Capacitors such as $C_2$, may also appear as discrete components. The control chip $C_c$ and other control components are adhered directly to the substrate and interconnected to various circuit points by thin conductors 122.

Along the front edge 114*a* of the substrate are formed a series of conductive pads 124 to which connections are made from points external to the substrate. Preferably, such connections take the form of L-shaped terminal pins 125 (drawn in phantom lines) having bases 126 soldered to the pads 124. These pins project through a series of holes 127 (FIG. 3) in the shell to form terminal pin socket connectors at the unit exterior.

Likewise, a number of conductive printed pads 129 are aligned near the front edge 116*a* of the power substrate (FIG. 7). Also as illustrated, the printed circuit conductor 118 forms a conductive surface underlying the entire metal block 120 so that the block and printed circuit are electrically connected. The transistors $Q_1$, $Q_2$ each have collector terminals that are exposed at the underside of each chip so that, when the chips $Q_1$ and $Q_2$ are adhered to the block, the collectors thereof are connected directly together and to one of the conductive edge pads 129 of the printed circuit 118.

Conductor leads 130 soldered to pins 132 projecting upwardly from the pads 129 electrically couple the base and emitter of each transistor chip to appropriate conductor pads, and those same pads are electrically terminated in similar L-shaped pins 133 (one shown in phantom for illustration purposes) that extend through the plastic shell 103. The thermistor leads 134 are joined to appropriate pads in the same way.

Certain thermal advantages accrue from the foregoing arrangement which, in effect, provides a thermal divider in the thermal circuit. This is contrasted with the usual practices of mounting all components on a single chassis or substrate and using a common heat sink (thermal short), and of packaging the heat sensitive control components so that they cannot be efficiently coupled thermally to the environment. With these practices, unacceptable regulation variations may result with temperature increases.

The thermal resistance between the control chip $C_c$ and the ambient environment is low relative to the thermal resistance between $C_c$ and the major heat generator $Q_1$, because the control chip $C_c$ is isolated from the power chip $Q_1$ by a dead air space and is coupled to the environment by the thermal conductor plate 101. This has the effect of keeping the temperature of the control chip $C_c$ relatively low and relatively independent of the heat produced by the power transistor $Q_1$. This feature, together with the previously described thermal protector circuit, permits the supply to be operated safely, even in applications where the heat sink employed by the customer is materially less than optimal.

In that connection, it is now evident that a heat sink may be secured to both plates 101, 102, if desired, since each provides a low thermal resistance to the surroundings.

It is evident that the primary heat source $Q_1$ may be essentially shorted (thermally) through the base plate 102 to the main heat sink associated with the external equipment. Even if the base plate is left free, however, a limited amount of heat dissipation may be obtained at the base plate 102 by radiation and convection to the environment, and the power supply can be operated at an appropriate reduced rating.

From the foregoing, it should be apparent that the unique power supply assembly enables a versatility of circuit use not realizable with prior art devices. It provides a thermal divider to ensure thermal stability during operation and includes unique packaging advantages that permit maximum power handling capability in a small volume. Its construction, furthermore, is designed for adaptation to mass production assembly and reliability of the circuit components.

Although the invention has been described with reference to a particular embodiment, many modifications, both in form and detail, will occur to those skilled in the art. For example, the shape of the plates and shell can be varied, and various printed circuit techniques can be implemented without departing from the inventive concepts disclosed. Accordingly, all such modifications and variations are intended to be included within the scope and spirit of the invention as defined in the claims.

We claim:

1. An electronic circuit package having as elements thereof an electronic component generative of undesired heat and an electronic heat sensitive component thermally decouplable therefrom, comprising:

a first chassis carrying the heat generative component and having high thermal conductivity for providing a thermal conductor to the package exterior;

a second chassis carrying the heat sensitive electronic component and having high thermal conductivity to provide a thermal conductor to the package exterior, said second chassis being disposed so as to be essentially thermoconductively independent of the first chassis; and means joining the first and second chassis in mutually spaced relationship and being substantially nonconductive of heat generated by the components carried by the chassis.

2. An electronic circuit package having as elements thereof an electronic component generative of undesired heat and at least one electronic heat sensitive component thermally decouplable therefrom, comprising:

a first chassis carrying the heat generative component and having high thermal conductivity for providing a thermal conductor to the package exterior;

a second chassis carrying the heat sensitive electronic component, and having high thermal conductivity to provide a thermal conductor to the package exterior; and a thermally insulating tubular shell disposed between the first and second chassis to form an enclosure for the electronic components.

3. The electronic circuit package claim 2, wherein:

the first and second chassis each comprises a plate spaced in generally parallel relation from the other.

4. The electronic circuit package of claim 2, further comprising:

a circuit substrate having mounted thereon the components comprising elements of an electrical circuit, the substrate being secured to one of the chassis to be in heat conductive contact therewith.

5. The electronic circuit package of claim 4, wherein:

the substrate has disposed thereon at least one conductive connection point for an electrical conductor connected to one or more of the circuit components.

6. The electronic circuit package of claim 5, further comprising:

electrical conductor means connected to the connection point of the substrate and extending through the shell to provide an external electrical terminal for the electrical circuit components on the substrate.

7. The electronic circuit package of claim 4, wherein:

each of the chassis has associated therewith a substrate carrying conductive areas;

the heat generative component is electrically connected to one or more conductive areas of one of such substrates; and the heat sensitive components are electrically connected to one or more conductive areas of the other of such substrates.

8. The electronic circuit package of claim 7, wherein:

the electronic circuit components comprise at least in part a film deposit on the substrate, such substrate being thermally conductive and electrically non-conducting.

9. The electronic circuit package of claim 4, wherein:

the substrate is electrically non-conducting and thermally conductive, and the heat generative component is mounted thereto in heat transfer relation to the first chassis.

10. The electronic circuit package of claim 7, further comprising: electrical conductor means for terminating the conductive areas externally of the package portion comprised of the joining means.

11. The electronic circuit package of claim 2, further comprising:

means associated with the first chassis and providing a heat spreading volume exposed to the interior of the tubular shell and thermally connected to the first chassis through a relatively low thermal resistance for dissipating to the package exterior a portion of the heat within the enclosure, said means mounting the heat generative component.

12. In an electrical circuit unit containing at least one electronic circuit component generative of undesired heat and further electronic components of the circuit that are heat-sensitive, an arrangement for increasing the power and temperature operating capacities of the circuit comprising:

a first heat conductive member carrying the heat generative component and providing low thermal resistance between such component and the ambience, such member including an external heat transfer surface;

a second member carrying the heat sensitive components and providing an external heat transfer surface, said second member being essentially completely thermoconductively decoupled from the first member; and means joining the first and second members and establishing therebetween a relatively high thermal resistance.

13. An electrical circuit unit according to claim 12, wherein:

the heat generative component is a solid state active element having relatively high current capacity; and the heat sensitive components include a solid state device operating on relatively low current flow therethrough.

14. The electrical circuit unit of claim 13, wherein:

the high current capacity element is a power transistor; and the low operating current device includes a signal level semiconductor for controlling the high current capacity element.

15. The electrical circuit unit of claim 13, wherein:

the electrical circuit is a power supply regulator in which current is supplied by the high current capacity element.

16. The electrical circuit unit of claim 15, wherein:

the low operating current device comprises a portion of a power supply regulator control circuit operative to control the conduction of the high current capacity element.

17. The electrical circuit unit of claim 16, wherein:

the control circuit includes passive elements deposited as a film on a substrate carried by the second heat conductive member.

18. The electrical circuit of claim 16, wherein:

the unit includes a heat conductive substrate secured to the second member;

the second member is heat conductive to provide thermal coupling to the environment; and the low operating current device is an integrated circuit chip mounted on such substrate to be thermally coupled to the second member.

19. The electrical circuit of claim 16, wherein:

the unit includes a heat conductive substrate carried by the first heat conductive member and providing an electrical conductor thereon; and a volume of material having relatively low thermal resistance is mounted to the substrate to be thermally coupled therewith to form a heat spreader adapted to distribute to the first member the heat originating at the active high current capacity element.

20. The electrical circuit of claim 19, further comprising:

means for electrically connecting the active high current capacity element to the conductor on the substrate.

21. A compact electrical regulator unit adapted for physical mounting to other equipment which may provide a heat sink therefor, comprising:

first and second spaced heat conductive members at least one of which has an exterior surface for mounting to an external heat sink to provide a path of a thermal conduction to the unit exterior;

a shell of low thermal conduction intermediate and joining the two members to form therewith an enclosure;

an active power output circuit carried by the interior surface of the first member and thermally coupled therewith; and a voltage regulator control circuit carried by the interior surface of the other member for regulating the conduction of the power output circuit.

22. The power supply unit of claim 21, wherein:

the active power output circuit comprises a semiconductor chip; and the voltage regulator control circuit comprises an integrated circuit chip.

23. The power supply unit of claim 21, wherein:

the other heat conductive member provides an exterior surface for mounting to an external heat sink, whereby the unit may be thermally coupled to an external heat sink at either conductive member.

24. A hybrid power supply regulator, comprising:

first and second heat conductive members each providing thermal coupling to an exterior surface thereof;

a pass transistor chip mounted to the first member to be thermally coupled thereto through a relatively low thermal resistance;

a control circuit including an integrated circuit chip, the circuit being secured to the second member to be thermally coupled thereto through a relatively low thermal resistance; and thermal insulating means joining the two members to establish therebetween a relatively high thermal resistance, thereby substantially to isolate the control circuit from heat dissipated by the pass transistor.

* * * * *